250-363 SR
1/7/86 OP H 000,012

United States Statutory Invention Registration [19]

[11] Reg. Number: H12

Bennett et al. [45] Published: Jan. 7, 1986

[54] NUCLEAR MEDICINE IMAGING SYSTEM

[75] Inventors: Gerald W. Bennett, East Moriches; A. Bertrand Brill, Shoreham; Yves J. C. Bizais, Upton; R. Wanda Rowe, Upton; I. George Zubal, Upton, all of N.Y.

[73] Assignee: The United States of America as represented by the United States Department of Energy, Washington, D.C.

[21] Appl. No.: 474,383

[22] Filed: Mar. 11, 1983

[51] Int. Cl.[4] ..... G01T 1/164

[52] U.S. Cl. ..... 250/363 S; 250/366; 250/369

[58] Field of Search ..... 250/363 S, 366, 369

[56] References Cited

U.S. PATENT DOCUMENTS 4,284,895 8/1981 Morgan et al. ..... 250/363 S

FOREIGN PATENT DOCUMENTS 1048166 12/1977 Canada ..... 250/363 S
55-26456 2/1980 Japan ..... 250/363 S
55-129781 3/1980 Japan ..... 250/363 S
2062851 10/1980 United Kingdom ..... 250/363 S

OTHER PUBLICATIONS

I. G. Zubal et al, paper presented International Workshop on Physics & Engineering in Medical Imaging; Mar. 15-18, 1982, Asilomar, Calif.

Bennett et al, Proc. of World Congress on Medical Physics & Biomedical Engineering; Jun. 1982; Hamburg, Germany; #21.08.

I. G. Zubal et al, First IEEE Computer Society International Conf. on Medical Computer Science Computational Medicine; Sep. 23-25, 1982, Phila. Pa.

(List Continued on next page.)

*Primary Examiner*—S. C. Buczinski
*Attorney, Agent, or Firm*—Vale P. Myles; Paul A. Gottlieb; Judson R. Hightower

[57] ABSTRACT

A nuclear medicine imaging system having two large field of view scintillation cameras mounted on a rotatable gantry and being movable diametrically toward or away from each other is disclosed. In addition, each camera may be rotated about an axis perpendicular to the diameter of the gantry. The movement of the cameras allows the system to be used for a variety of studies, including positron annihilation, and conventional single photon emission, as well as static orthogonal dual multi-pinhole tomography. In orthogonal dual multi-pinhole tomography, each camera is fitted with a seven pinhole collimator to provide seven views from slightly different perspectives. By using two cameras at an angle to each other, improved sensitivity and depth resolution is achieved. The computer system and interface acquires and stores a broad range of information in list mode, including patient physiological data, energy data over the full range detected by the cameras, and the camera position. The list mode acquisition permits the study of attenuation as a result of Compton scatter, as well as studies involving the isolation and correlation of energy with a range of physiological conditions.

1 Claim, 11 Drawing Figures

Microfiche Appendix Included
(2 Microfiche, 163 Pages)

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

Y. Bizais et al, paper presented 1982 Nuclear Science Symposium (IEEE); Oct. 20–22, 1982; Wash., D.C.

Y. Bizais et al, paper presented VIIIth Information Process. in Medical Imaging Conf.; Aug.–Sep. 1983; Brussels, Belgium.

G. Bennett et al, Proc. of International workshop on Physics & Engineering in Medical Imaging; Jul. 1982; IEEE; "The UNICON, a Universal Nuclear Imaging Construct."

G. Q. Maguire et al, Proc. of Post Congress Meeting; Paris, France; Sep. 4, 1982.

Y. Bizais et al, 1983 Abstract Form for Scientific Papers & Scientific Exhibits Society of Nuclear Medicine 30th Annual Meeting; St. Louis, Missouri; Jun. 7–10, 1983; #9769, #17974.

I. G. Zubal et al, IEEE/Engineering in Medicine & Biology Soc., 5th Annual Conf.; Columbus, Ohio; Sep. 10–12, 1983.

Y. Bizais et al, Brookhaven National Laboratory, BNL 33209; 1983 by G. K. Hall; Boston, Ma.

I. G. Zubal et al, IEEE 1983 Nuclear Science Symposium; San Francisco, Ca.; Oct. 19–21, 1983; BNL 33914.

High Temporal Resolution ECG-Gated Scintigraphic Angiocardiography; M. V. Green et al, J. Nuclear Medicine, vol. 16, #1, p. 95, Jan. 1975.

NUCLEAR MEDICINE IMAGING SYSTEM

BACKGROUND OF THE INVENTION

The United States Government has rights in this invention pursuant to Contract Number DE-ACO2-76CH00016, between the United States Department of Energy and Associated Universities, Inc.

This application includes a microfiche appendix comprising two microfiche with a total of 163 frames.

The present invention relates to scintillation camera systems, and more particularly to a universal camera system capable of list mode acquisition of a full range of data including patient physiological data and all available energy data and having movable cameras capable of stationery dual multipinhole studies as well as rotational scanning.

Gamma camera systems for medical applications are exemplified in the well known Anger system disclosed in U.S. Pat. No. 3,011,057. Gamma ray cameras of this type are used in nuclear medicine to detect gamma radiation or other high energy photons emitted from a body in which a radioisotope has been infused. The quantity of gamma ray photons emitted depends upon the quantity of isotope which is absorbed by the tissue in a body organ under examination. The emitted gamma ray photons are absorbed in a plate of crystalline material and a scintillation occurs at the point of absorption. Most of the points of absorption in the crystal have substantially the same x and y coordinates as the point in the body from which the gamma ray photon is emitted, since the photons are directed to the scintillation crystal with a collimator that eliminates most photons which are in an angular course toward the scintillation crystal. An array of photomultiplier (PM) tubes, generally hexagonally arranged, are optically coupled to the crystal so that each tube will produce an output pulse signal whose magnitude depends on the particular geometrical relationship of the tube to the scintillation events being detected. Each PM tube has an x and y coordinate. The signals from each tube are supplied to a position calculator, generally a resistor weighting matrix which uses the simultaneous pulse signals from each tube to compute the x and y coordinates of each scintillation event. The x and y coordinate signals are used to drive the deflection coils of a cathode ray tube or similar display. Conventionally, the energies of all PM tube pulses for each scintillation event are summed to produce a total energy or intensity signal which is subjected to pulse height analysis. If the total energy falls within the window of the analyzer, a z pulse is produced which unblanks the cathode ray tube display to write a light spot on the display screen at the calculated x, y coordinates of the event.

Since the introduction of the gamma camera systems a great deal of research and development has been undertaken in the field of three dimensional image reconstruction utilizing these systems. Much of this effort has been directed at improving resolution and sensitivity in order to obtain clinically useful tomographic images.

One of these advances is the introduction of seven pinhole tomography developed by Vogel, et al., and first reported on in the *Journal of Nuclear Medicine*, Vol. 19, pgs. 648–654, 1978.

Most of the systems developed in recent years were specialized systems intended for a single mode of operation and not adaptable for other methods of operation.

For example, position emission systems are not suitable for single photon emission computed tomography. Systems which utilize energy or intensity signals only within the window of the analyzer cannot be used to study Compton effect. Most systems ignore patient physiological data or make no systematic provision for obtaining physiological data. In addition, most systems have fixed camera arrangements not suitable to changing for other types of studies.

SUMMARY OF THE INVENTION

It is an object of this invention to provide a nuclear imaging system having the versatility to do positron annihilation studies, rotating single or opposed camera gamma emission studies, and orthogonal gamma emission studies.

It is a further object of this invention to provide an imaging system having the capability for orthogonal dual multipinhole tomography.

It is another object of this invention to provide a nuclear imaging system in which all available energy data, as well as patient physiological data, are acquired "simultaneously" in list mode.

This invention provides a nuclear medicine imaging system having two large field of view scintillation cameras mounted on the rotatable gantry in a manner which allows the cameras to be moved radially toward or away from each other and in addition allows the cameras to be rotated on the gantry so that they are orthogonal to each other. In addition, this invention provides for orthogonal dual seven pinhole tomography.

The camera mounting and the computer interface system allow this multi-purpose system to be used for positron annihilation studies as well as single photon emission studies.

The gantry and camera subsystem are connected to a powerful data processing system through an interface which allows the digitation and list mode recording of energy for all events over a wide range.

In addition, the interface acquisition format may be varied to change the allocation of the number of bits available for position and energy information. For example, the usual format for acquisition of x, y and energy data is 7 bits each for the x and y and up to 9 bits for the energy associated with each event. However, if it is desirable for some reason 5 bits might be allocated to the x data and 9 bits for the y data, thereby giving better spatial resolution in one direction than the other.

Due to the ability to acquire energy data over a broad range multiple isotopes may be imaged simultaneously. As a result of acquiring all data in list mode, the computer may be programmed to perform a variety of operations to enhance image formation or to extract particular information. Specifically, events may be weighed as a function of their energy. This ability allows unscattered events on the distal side of the energy photo-peak to be weighed more heavily than those on the proximal side which have undergone Compton scattering in the object or patient being imaged.

The advantages of acquiring data in list mode with the ability to change the format of the acquisition provides the physician with great research flexibility with respect to extracting useful information from the data acquired by the computer.

In one embodiment of this invention each camera is fitted with a seven pinhole collimator and rotated so that the cameras are orthogonal. The camera are then used for dual seven pinhole tomography which provides improved sensitivity and resolution over conventional seven pinhole tomography.

DETAILED DESCRIPTION OF THE INVENTION

Figure 1:
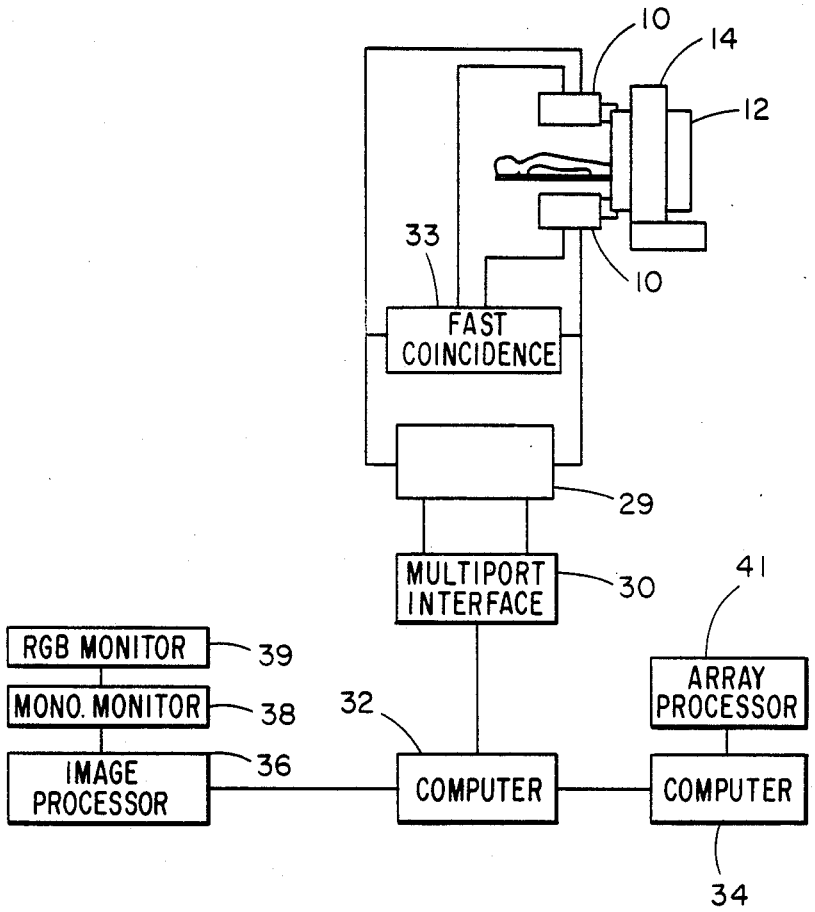
FIG. 1 is a block diagram of the preferred embodiment of the invention.

A nuclear medicine imaging system incorporating the preferred embodiment of the present invention is shown in FIG. 1. The two large field of view scintillation cameras 10 are "Anger-Type" cameras which are well known in the field and are fully described in U.S. Pat. No. 3,011,057, 3,745,345 and 3,984,689, to which reference may be made for a detailed discussion of the general operation and structure of the camera. These cameras convert scintillation events from radiation into electric signals that represent the x, y position coordinates of each event and the energy (z) of each event. Generally, it has been the practice to put the energy or intensity signal (z) through a pulse height analyzer or "window" and to accept for processing only those signals within the energy limits of the window. As will be seen hereinbelow, the present invention acquires all of the energy or intensity signals generated by the camera as part of its list mode acquisition.

The scintillation cameras 10 are mounted on a gantry 12 which is rotatable about a horizontal axis of rotation. The support frame 14 supports the weight of the gantry and cameras and provides the bearing surfaces for rotation of the gantry.

Figure 4:
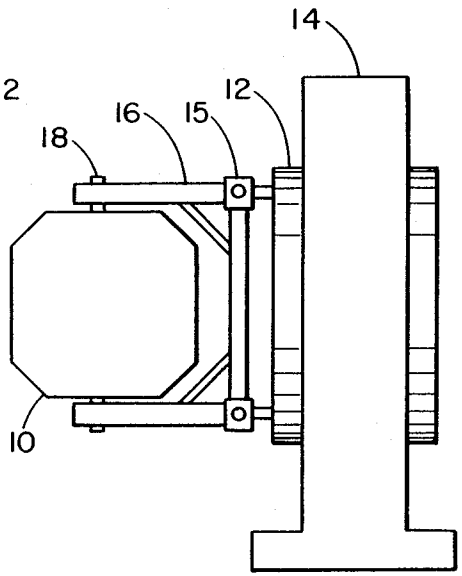
FIG. 4 is a schematic side view showing the gantry and cameras of FIG. 1 with the gantry rotated 90°.
Figure 3:
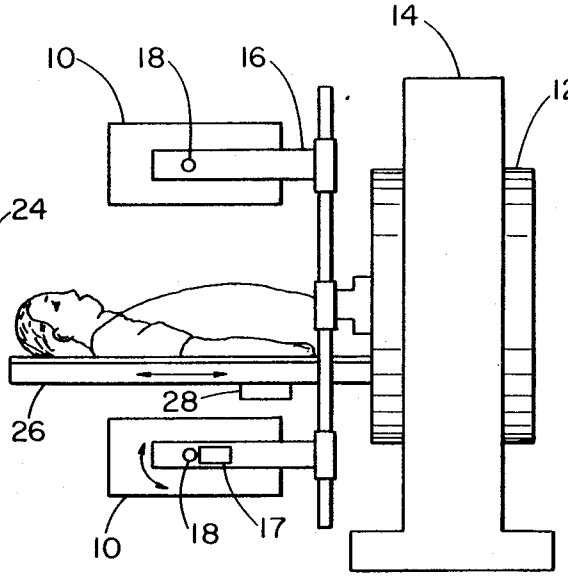
FIG. 3 is a schematic side view showing the gantry and cameras of FIG. 1.
Figure 2:
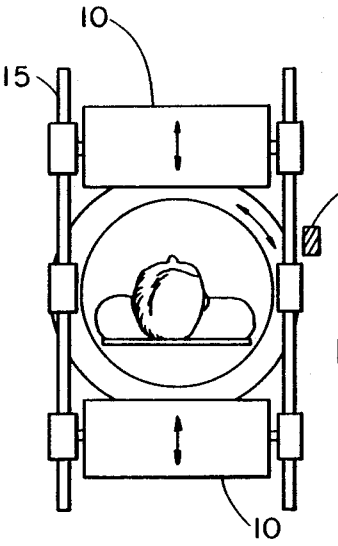
FIG. 2 is a schematic front view showing the gantry and cameras of FIG. 1 as viewed along the axis of the gantry.

Turning now to FIGS. 2, 3 and 4, there is shown in schematic form the mounting of the cameras 10. In FIG. 2, which is a front axial view showing the gantry and camera mountings, it will be seen that the cameras are rotatably mounted on camera support yokes 16, and that the cameras may be positioned so that they are facing each other as shown in FIGS. 1, 2, 3, and 4, or may be placed at an angle with respect to each other by means of electric drive motors 17, which rotate the cameras on bearings 18, shown in FIG. 3 and 4.

The camera support yokes are mounted on guide rails 15 attached to the gantry 12 so that the cameras may be moved diametrically toward or away from each other. This movement of the cameras is controlled by electric drive motor 22.

The gantry 12 is rotatably mounted on the frame 14, and the gantry may be rotated through 360° by means of the electric drive motor 24.

A bed 26, which is axially movable by means of an electric drive motor 28 provides means for longitudinally moving a patient with respect to the field of view of the cameras.

Figure 5:
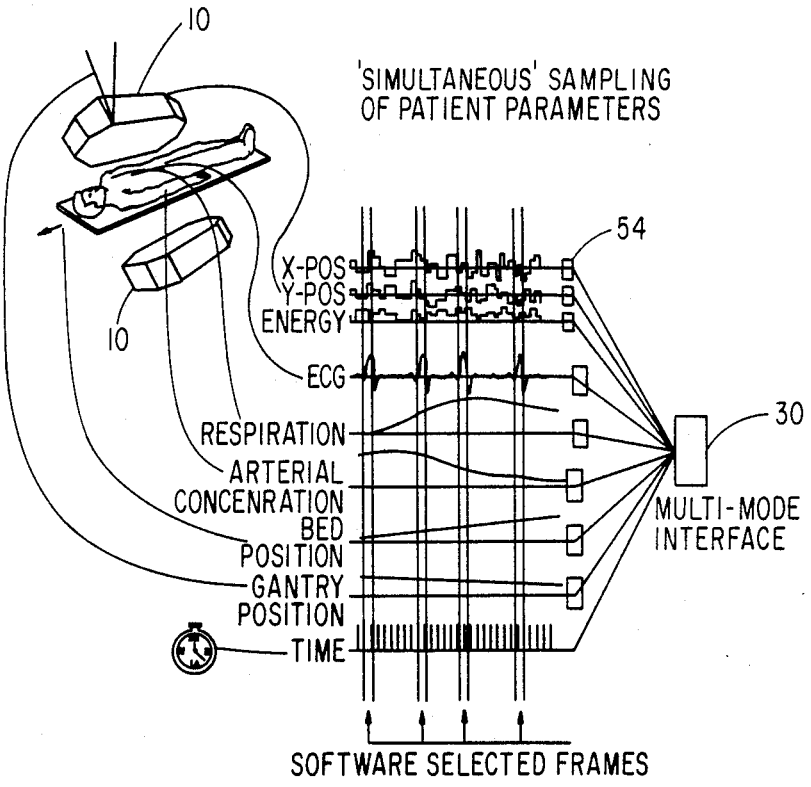
FIG. 5 is a schematic diagram illustrating the sampling of physiological and camera data.

Returning now to FIG. 1, there is shown a camera console 29, and computer interface 30 into which is fed x, y and energy or intensity signals (z) for each camera as well as physiological signals and position signals for the cameras, gantry and bed. FIG. 5 shows that the physiological signals being monitored are ECG, respiration, and arterial concentration. However, it will be apparent that almost any physiological signal of interest may be digitized and supplied to the interface. The interface 30 is connected to a computer 32, which in this case is a PDP11/34, a trademark for a widely used computer manufactured by the Digital Equipment Corporation. In order to increase the versatility of the system, the computer 32 is interconnected to a more powerful computer system 34, in this case a VAX11/780, also a trademark for a computer manufactured by Digital Equipment Corporation, capable of complex data processing required for image reconstruction. An image processor 36 is interconnected with the computer and a black and white monitor 38, as well as a color monitor, 39, are provided for display purposes. An array processor 41 is connected to the computer 34 for image processing and reconstruction and a fast coincidence system 33 provides coincidence detection for positron emission studies. Other available computers and display systems could be substituted for the specific equipment identified above.

DESCRIPTION OF INTERFACE

Figure 6:
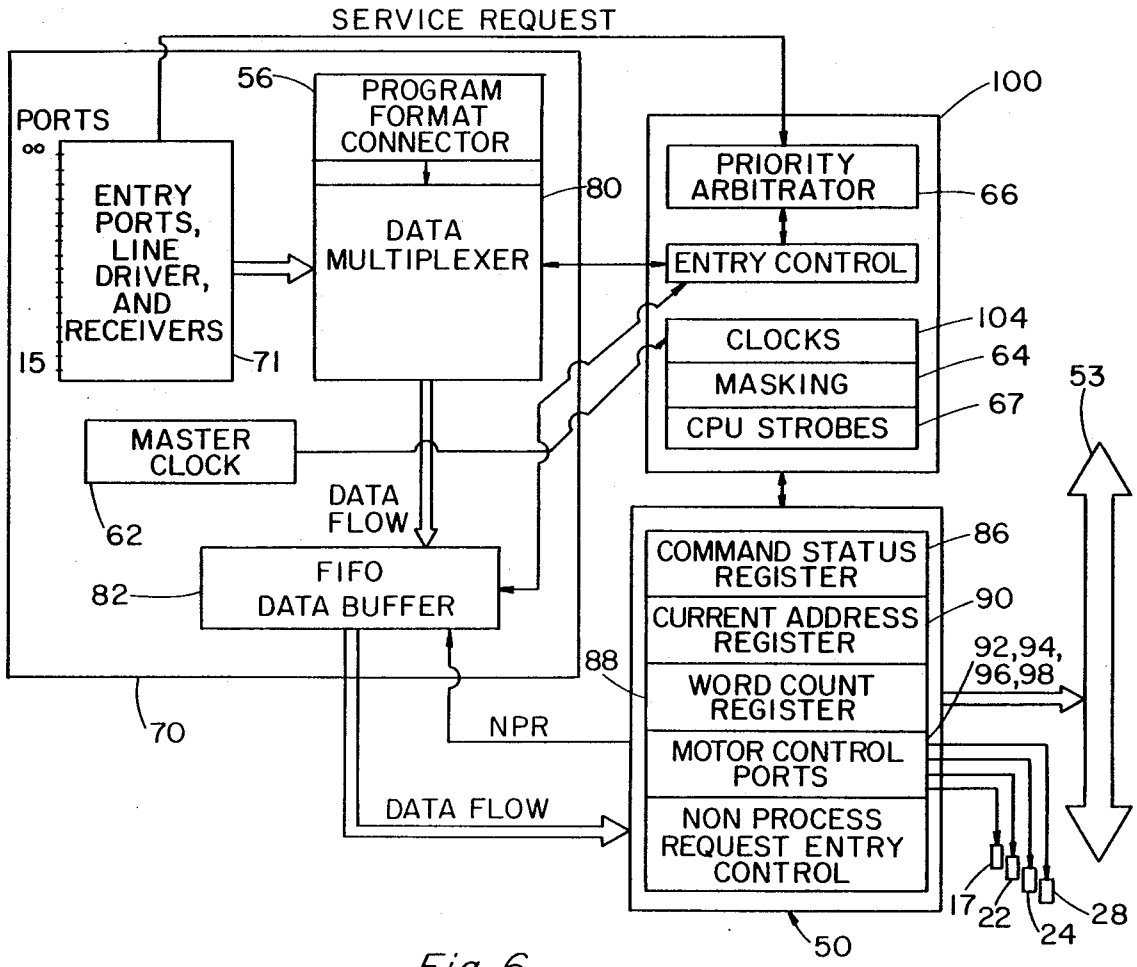
FIG. 6 is a block diagram of the multiport interface shown in FIG. 1.

FIG. 6 shows the major elements of the interface 30 in block diagram form. The interface 30 is made up of three sections.

The multiplex lower section 70 includes 16 data entry ports 71 into which flow camera data and non-camera data. The camera data and non-camera data are multiplexed in a data multiplexer 80 and then fed into a first-in-first-out (FIFO) data buffer 82 having a 64 word capacity. A master clock 62 includes a master crystal oscillator from which are derived clock signals for the internal clocks associated with each of the non-camera ports. A program format connector 56 is a removable connector which contacts pins on the interface chasis to which are brought x, y camera data, energy data, a software generated time mark and port address lines. By providing several different program format connectors, the formatting of the x, y signals as well as the energy or intensity signal, may be varied, thereby increasing the flexibility of the system.

The bus interface 50 keeps track of the current memory register addressed in the computer, as well as how large a word count the memory buffer size should be. The mode of operation of the interface (e.g., data formats, clock speed, etc.) is established by the user via the computer 32. Within the bus interface are command status register 86, a word count register 88, and current address register 90, and four motor control ports 92, 94, 96, and 98, for controlling bed, camera and gantry position.

The multiplex upper section 100 includes a priority arbitrator 66, an entry control 102, clocks 104, masking 64 and central processing strobes 67. The priority arbitrator determines priority between the ports and is set to give priority to camera events over non-camera events. The priority arbitrator may be changed to give priority to non-camera events, which are much less frequent than camera events, if so desired. The clocks 104 permit the non-camera port to be queried by the system at time intervals determined by the computer software.

The interface has been wired from a computer generated wiring list based on design equation which describe the system logic and hardware. The microfiche appendix to this application includes the computer generated wiring system and design equations. For a full description of the interface, the reader is referred to this microfiche appendix.

Figure 7:
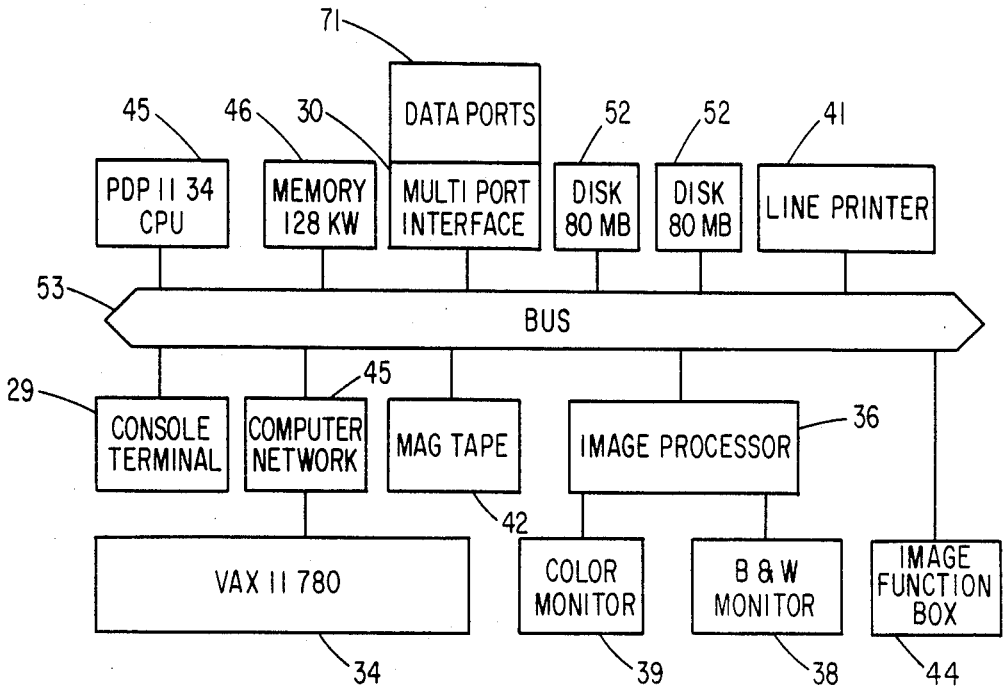
FIG. 7 is a block diagram of the data acquisition, processing and display system embodying the present invention.

FIG. 7 is a schematic representation of the computer and display system. The computer bus 53 interconnects two disk memory storage units 52, a line printer 41, the camera console terminals 29, a magnetic tape unit 42, an image processor 36, an image function box 44, the central processing unit 45 of the computer 32, the internal memory 46 of the computer 32, and the monitors 38 and 39, as well as a local computer network 45 connecting the system to the computer 34 shown in FIG. 1. The data ports and entry 71 provide the input to the interface 30.

DETAILED DESCRIPTION OF ORTHOGONAL DUAL MULTIPINHOLE TOMOGRAPHY

In the 1978 publication entitled, "A New Method of Multiplanar Emission Tomography Using a Seven Pinhole Collimator, and an Anger Scintillation Camera", referred to hereinabove, Vogel, et al., described a new system utilizing advanced computerized imaging techniques and a stationary seven pinhole collimated wide field of view Anger camera to reconstruct multiple plane images. A seven pinhole collimator is used with a standard Anger scintillation camera to provide seven simultaneous images of the radioactive subject. The tomographic planes are reconstructed by a translation and addition-multiplication algorithm, which is equivalent to the well known back-projection reconstruction technique. The maximum angle between views in this system is approximately 53°, and as a result of this, it has poor depth resolution and the quality of the reconstructed images is not always satisfactory.

As indicated hereinabove, seven pinhole tomography, which uses a conventional Anger camera, is a stationary detector system well suited for imaging time-varying three dimensional distributions of radioactivity in a subject. However, its low sensitivity and depth resolution yield inadequate reconstructed images.

Figure 8:
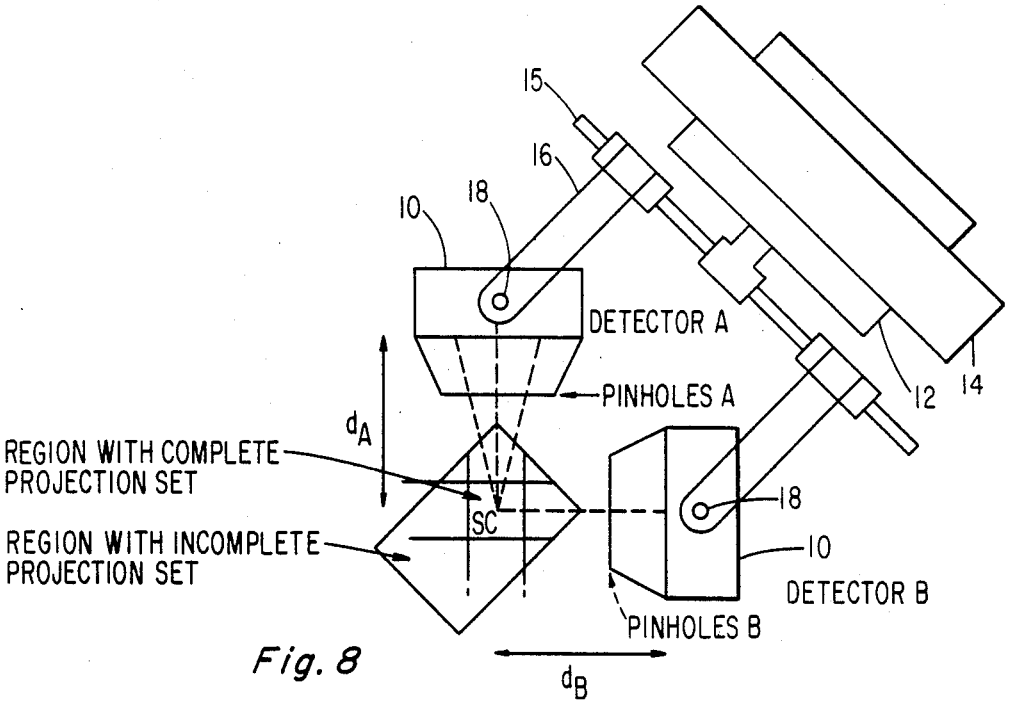
FIG. 8 is a schematic top view showing the gantry and cameras of FIG. 4 with the cameras rotated to form a 90° angle between them for dual seven pinhole tomography.

FIG. 8 shows the preferred embodiment of this invention in a position suitable for stationary orthogonal dual seven pinhole imaging.

The cameras are rotated about their axis 18 until they are at 90° with respect to each other. Although the 90° is the optimum angle for providing the best depth resolution, it will be understood that the angle between the camera may vary somewhat without significantly reducing the depth resolution, and in certain clinical situations it may be desirable to set the angle anywhere between 60° and 120°.

Acquisition and processing are realized using the hardware and software of the Nuclear Imaging System shown in FIG. 1. Camera data are digitized and stored in list mode onto a large disk connected to the computer 32. Data are transferred to the computer 34 where projection matrices are built and tomographic images are reconstructed. The 3D distribution is visualized, slice-by-slice, on a display attached to the computer 32.

When more than one detector is used the reconstruction volume cannot be decomposed into non-uniform voxels as it is done in the original seven pinhole tomography (7PHT) algorithm, which is correct from a sampling viewpoint. Therefore, uniform cubic voxels were chosen since they lead to a more natural representation of space. Finally, because D7PHT is intended to be used for dynamic studies the algorithm has been broken into distribution-independence, and distribution-dependent procedures in order to speed up the reconstruction process.

The reconstruction algorithm has been broken into two parts: the first one, distribution-independent, computes the projection matrix from the system geometry; the second one iteratively builds a 3D radioactivity distribution from its projections using the projection matrix. Importantly, this algorithm can reconstruct large volumes.

Physical performances of this system have been characterized. Sensitivity is a 8 Kcps/(Ci/cc) for a 22 cm diameter phantom. The overall resolution is isotropic and the width of the impulse response varies from 9 mm to a point source at 230 mm from each detector to 15 mm at 480 mm.

The limiting factor in dynamic studies is the count rate acceptable with regard to patient dose, and detector dead time. For the present sensitivity and for injected activities between 1 and 10 mCi, 1 million events can be detected in 1 to 5 minutes. The acquisition time is compatible with the study of dynamic and cyclic processes, particularly cerebral and myocardial uptake and gated blood pool imaging.

CALIBRATION AND ACQUISITION

The system geometry (See FIG. 8) is characterized by the system center (SC) at the intersection of the two detector axes. Distances ($d_A$, $d_B$) from the system center to detectors A and B define the maximum reconstruction volume. Strictly speaking, this volume is the intersection of two hexagonal cross-section cylinders with vertex radius (R) equal to the distance from the central pinhole to any peripheral pinhole. However, it has been extended to points having less than 14 projections. The distance ($d_1$) between the detector and the pinhole plane is also necessary to relate a voxel location to its projection locations.

Three dimensional reconstruction from a small set of projections is very sensitive to distortions in projection images. Therefore, a calibration procedure is carried out every time 3D distributions have to be acquired under a new system geometry or tune. First the system parameters ($\alpha$, $d_A$, $d_B$) are measured accurately. Then a point source at the system center is imaged. A 2D least-squares fit to a nexagon of its projections gives optimal estimates of camera offsets, the orientation of the pinhole pattern about the camera axis, and the pixel dimensions. It also provides a distortion index which allows one to decide whether or not the cameras are suitable for tomographic purposes (see the following table as an example of the calibration procedure).

| CALIBRATION PROCEDURE | | |
|---|---|---|
| POINT SOURCE FILE NAME | [RAMTEK, DATA]PS633.DAT | |
| FLOOD SOURCE FILE NAME | [RAMTEK, DATA]FLAB.DAT | |
| PROJECTION FILE NAME | [RAMTEK, DATA]LIVTOT.DAT | |
| 3-D OBJECT FILE NAME | YBD:TEST1 | |
| VOXEL SIZE | | 2.00 |
| DISTANCE COLLIMATOR CRISTAL | | 125.00 |
| DISTANCE COLL. FOCAL PLANE | | 250.00 |
| DISTANCE CRISTAL-1 CENTER | | 330.00 |
| DISTANCE CRISTAL-2 CENTER | | 330.00 |
| DISTANCE BETWEEN 2 PINHOLES | | 62.50 |
| NO OF ITERATIONS | | 1 |
| NO OF VOXELS PER ROW | | 32 |
| DUMPING FACTOR | | 32.00 |
| DETECTOR NB 1 | DETECTOR NB 2 | |
| ALFA = 63.594 | ALFA = 65.396 | |
| BETA = 63.778 | BETA = 67.739 | |
| TETA = 0.016 RAD | TETA = 0.014 RAD | |
| RADIUS = 29.513 | RADIUS = 30.436 | |
| CENTRAL ERROR = 0.212 | CENTRAL ERROR = 0.472 | |
| MEAN ERROR = 0.817 | MEAN ERROR = 1.020 | |
| PIXEL SIZE = 3.357 | | |

Flood field projections are acquired as part of the calibration procedure. Flood field correction can be considered essentially as a first order correction for variations in solid angle throughout the effective field of each pinhole and simultaneously for variations in detector sensitivity.

Calibration data are, therefore, very similar to those used in 7PHT, the way they are processed differs.

RECONSTRUCTION ALGORITHM

For a given system geometry and camera distortions, each voxel (k: 3D index) of the reconstruction volume can be associated with up to 14 projections, whatever the actual radioactivity distribution is. Each projection (ik: Projection of voxel k through pinhole i) is characterized by its location (l(ik): l is a 2D index) and a weighting factor w(ik), which takes into account the attenuation along the ray and the solid angle with the pinhole sees the voxel. A projection mask built from the point source data at the system center, then the projection parameters are computed by simple geometric formulas only once for a given system geometry, and the resulting projection array is stored in a compact form onto disk.

Figure 9:
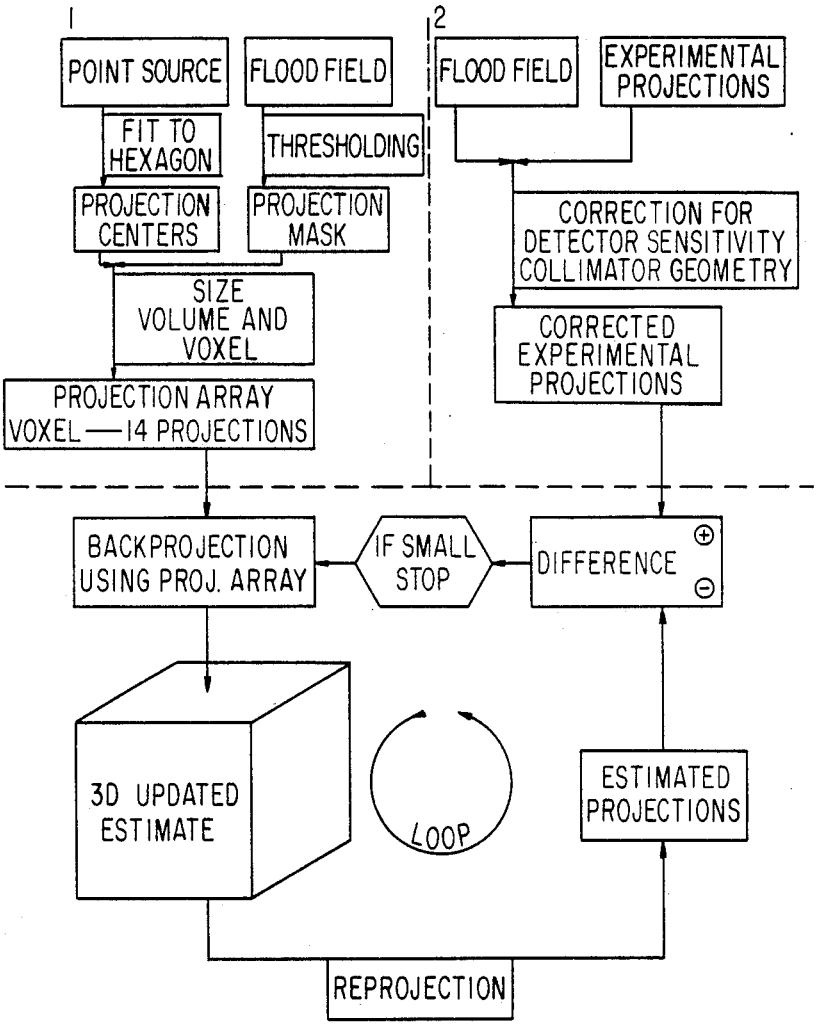
FIG. 9 is a reconstruction algorithm flow chart for dual seven pinhole tomography utilizing the preferred embodiment of the invention.

The algorithm is summarized in the flow chart given in FIG. 9.

RESULTS

This algorithm has been coded in FORTRAN 77 and implemented on the computer 34. Several features make it attractive for development purposes and routine use:

a) it is divided into distribution-independent and distribution-dependent procedures, such that reconstruction of 3D distributions acquired under the same detector conditions can be speeded up;

b) the number of voxels and the voxel size are chosen independently; thus the reconstruction time can be optimized for a given reconstruction volume and object resolution.

The ability of this new tomographic procedure to reconstruct 3D distributions was evaluated by measuring the global sensitivity and the resolution of the system. Distances $d_A$ and $d_B$ have been set equal to a common value d, and a 250 Ci Tc-99m point source has been placed at successive locations on the diagonal of the detector axes, one inch apart on each side of the system center. Measurement were repeated for various values of d.

Figure 10:
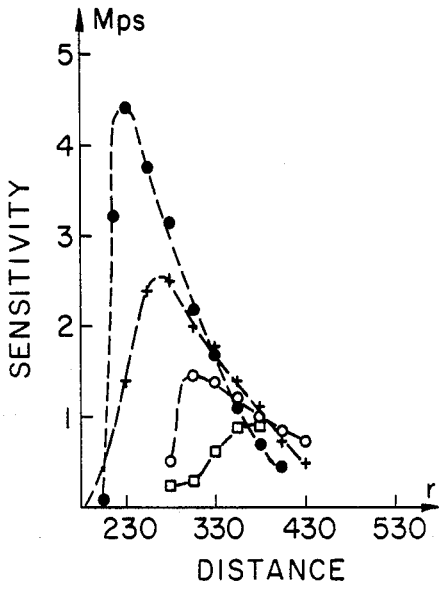
FIG. 10 is a graph showing sensitivity variation with distance when doing dual seven pinhole tomography.

FIG. 10 shows how sensitivity varies with d and with the point source location (r). For small values of r, sensitivity falls off very quickly as the number of projections decreases. This effect is more obvious for small values of d. On the other hand, count rate falls off smoothly with increasing r, because of decreasing solid angle. Therefore, when extended sources are imaged, $d_A$ and $d_B$ must be chosen such that the source is as close as possible to the detector but far enough to allow every point to have a reasonable number of projections.

Figure 11:
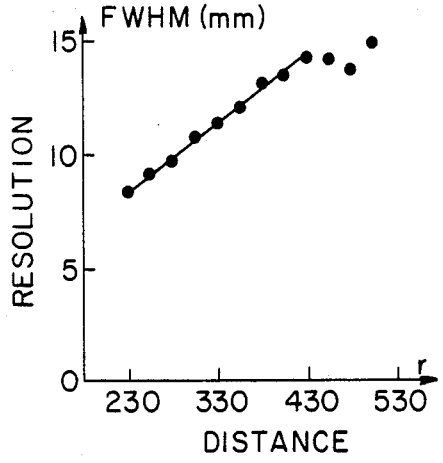
FIG. 11 is a graph showing resolution as a function of distance when doing dual seven pinhole tomography.

Point sources located where sensitivity has been measured have been reconstructed from their projections. In order to estimate the shape of the impulse response, the reconstruction has been oversampled (voxel size=-pixel size/4). Reconstruction images are consequently blurred. Variances of the distribution along each axis have been computed, and FWHM have been estimated from them, assuming a Gaussian model. FIG. 11 shows how FWHM varies with d and r over a broad range which covers values of every clinical situation. As expected, resolution degrades with distance to the detectors, but improvements compared with conventional 7PHT are dramatic. They can be explained by both the use of a dual detector system and the use of the minimum estimator.

Standard Measurement of sensitivity using a 22 cm diameter cylindrical phantom has been performed. 470,000 counts/min/(Ci/cc) were detected in a 20% photopeak window when the cylinder was at the system center (330 mm from the detectors).

Tests using more realistic phantoms have been carried out and the reconstruction of a liver phantom presenting a 3 cm diameter cold lesion in the middle of the right lobe provides reasonable reconstruction despite a very simple attenuation model and a very large reconstruction volume.

We claim:

1. A nuclear imaging system comprising:

a) a rotatable gantry having a horizontal axis of rotation;

b) a pair of large field of view scintillation cameras mounted on opposite sides of the gantry;

c) means for moving the cameras diametrically toward or away from each other;

d) means for rotating each camera about an axis perpendicular to the diametrical line of movement of the cameras, whereby the cameras may be positioned facing each other or may be positioned at an angle to each other; and e) computing means for processing signals from the cameras to form images of radioactive subjects placed in the field of view of the cameras.

* * * * *